United States Patent [19]

Akada et al.

[11] Patent Number: 6,120,374
[45] Date of Patent: Sep. 19, 2000

[54] APPARATUS FOR AND METHOD OF DESIGNATING A POINT ON DISPLAYED IMAGE, AND READABLE RECORDING MEDIUM STORING PROGRAM FOR DESIGNATING A POINT ON DISPLAYED IMAGE

[75] Inventors: Isao Akada; Koji Toyohara; Kazuo Iwasaki, all of Kobe; Katsuyoshi Endo, Ikeda; Naoki Nishikawa; Kenji Fujioka, both of Kobe; Hiroshi Tanibuchi, Amagasaki, all of Japan

[73] Assignee: Kabushiki Kaisha Konami Computer Entertainment Osaka, Osaka-fu, Japan

[21] Appl. No.: 08/910,503

[22] Filed: Aug. 4, 1997

[30] Foreign Application Priority Data

Aug. 5, 1996 [JP] Japan ................... 8-205997

[51] Int. Cl.[7] ................................... A63B 15/00
[52] U.S. Cl. .................. 463/3; 463/30; 463/31
[58] Field of Search .................. 463/3, 4, 7, 48, 463/49; 273/317.6, 317.1, 317.2, 317.3, 317.4, 317.5

[56] References Cited

U.S. PATENT DOCUMENTS

| 4,326,715 | 4/1982 | Ito et al. ................... 273/88 |
|---|---|---|
| 4,386,776 | 6/1983 | Bromley ................... 273/85 G |
| 5,394,168 | 2/1995 | Smith, III et al. . |
| 5,435,554 | 7/1995 | Lipson . |

FOREIGN PATENT DOCUMENTS

0785499  7/1997  European Pat. Off. .

*Primary Examiner*—Valencia Martin-Wallace
*Assistant Examiner*—Sheila Clayton
*Attorney, Agent, or Firm*—Jordan and Hamburg LLP

[57] ABSTRACT

A manual controller of a video game system has a plurality of control switches for controlling the motion of an image displayed on a display screen, and an analog joystick for designating a point in a given area on the displayed image. When the analog joystick is operated by the game player of the video game system, it is tilted to a position in a desired direction in a two-dimensional plane, and outputs a positional signal depending on the tilted position thereof. A coordinate transforming unit converts first and second two-dimensional coordinates of the tilted position respectively into third and fourth two-dimensional coordinates of an image position with respect to a predetermined reference position on the displayed image, with a first conversion constant for converting the first coordinate into the third coordinate and a second conversion constant, which is different from the first conversion constant, for converting the second coordinate into the fourth coordinate.

28 Claims, 6 Drawing Sheets

APPARATUS FOR AND METHOD OF DESIGNATING A POINT ON DISPLAYED IMAGE, AND READABLE RECORDING MEDIUM STORING PROGRAM FOR DESIGNATING A POINT ON DISPLAYED IMAGE

BACKGROUND OF THE INVENTION

1. Field of the Invention

The present invention relates to an apparatus for and a method of designating, with a manual controller, a certain point within a given area having different vertical and horizontal dimensions, such as a polygonal area, an elliptical area, etc. on an image displayed on an image display unit, and a readable recording medium which stores a program for designating a certain point within a given area on an image displayed on an image display unit.

2. Prior Art

Heretofore, images displayed on the display screen of the image display unit of a video game system such as a television game system are controlled in their movement by the game player with a plurality of control switches on a manual controller. Certain video games require the game player to designate a certain point on displayed images. In a video baseball game, for example, it is necessary for the game player to designate a position where the pitcher is to pitch the baseball (hereinafter referred to as a "pitching position"), or a position where the batter is to swing the bat (hereinafter referred to as a "swinging position"). It has been customary for the game player to designate such a position by operating a digital joystick such as a cross key.

When the digital joystick is operated, a contact position thereof which is displayed on the displayed image moves two-dimensionally in four directions to a point where the digital joystick outputs a corresponding positional signal. The contact position based on the positional signal is converted by a coordinate transforming unit into an image position that is expressed as X and Y coordinates with respect to a reference point on the display screen of the image display unit.

When the contact position based on the positional signal is converted into the image position by the coordinate transforming unit, a conversion constant used to convert the contact position into the X coordinate and a conversion constant used to convert the contact position into the Y coordinate are the same as each other. Therefore, the game player of the video baseball game can only designate a pitching position only within a square area on the displayed image though an actual strike zone is displayed as a vertically long rectangular shape on the displayed image. Such limitations have failed to make the video baseball game realistic.

It has been known to designate a position on a displayed image with an analog joystick which is capable of continuously generating two-dimensional coordinates in relation to positions on the displayed image.

SUMMARY OF THE INVENTION

It is therefore an object of the present invention to provide an apparatus for and a method of designating, with a joystick, a certain point within a given area having different vertical and horizontal dimensions, such as a polygonal area, an elliptical area, etc. on an image displayed on an image display unit.

Another object of the present invention is to provide a readable recording medium which stores a program for designating a certain point within a given area on an image displayed on an image display unit.

According to an aspect of the present invention, there is provided an apparatus for designating a position in an area on a displayed image, comprising image display means for displaying an image on a display screen, designating means for designating a point in a predetermined area having different vertical and horizontal dimensions on the image displayed on the display screen, the designating means including a joystick tiltable in a two-dimensional direction for generating a positional signal depending on a tilted position thereof and a coordinate transforming unit for converting first and second two-dimensional coordinates of the tilted position based on the positional signal respectively into third and fourth two-dimensional coordinates of an image position with respect to a predetermined reference position on the displayed image, with a first conversion constant for converting the first coordinate into the third coordinate and a second conversion constant, which is different from the first conversion constant, for converting the second coordinate into the fourth coordinate.

According to another aspect of the present invention, there is provided a method of designating a position in an area on a displayed image, comprising the steps of displaying an image on a display screen, designating a point in a predetermined area having different vertical and horizontal dimensions on the image displayed on the display screen, with a joystick tiltable in a two-dimensional direction for generating a positional signal depending on a tilted position thereof, and converting first and second two-dimensional coordinates of the tilted position based on the positional signal respectively into third and fourth two-dimensional coordinates of an image position with respect to a predetermined reference position on the displayed image, with a first conversion constant for converting the first coordinate into the third coordinate and a second conversion constant, which is different from the first conversion constant, for converting the second coordinate into the fourth coordinate.

According to still another aspect of the present invention, there is provided a readable recording medium storing a program for designating a position in an area on a displayed image by displaying an image on a display screen, designating a point in a predetermined area having different vertical and horizontal dimensions on the image displayed on the display screen, with a joystick tiltable in a two-dimensional direction for generating a positional signal depending on a tilted position thereof, and converting first and second two-dimensional coordinates of the tilted position based on the positional signal respectively into third and fourth two-dimensional coordinates of an image position with respect to a predetermined reference position on the displayed image, with a first conversion constant for converting the first coordinate into the third coordinate and a second conversion constant, which is different from the first conversion constant, for converting the second coordinate into the fourth coordinate.

According to yet still another aspect of the present invention, there is provided an apparatus for designating a position in an area on a displayed image, comprising an image display unit for displaying an image, a joystick, tiltable to a tilted position in a two-dimensional direction, for designating a point in a predetermined area having different vertical and horizontal dimensions on the displayed image, and a coordinate transforming unit for converting first and second two-dimensional coordinates of the tilted position respectively into third and fourth two-dimensional coordinates of an image position with respect to a predetermined reference position on the displayed image, with a first conversion constant for converting the first coordinate into the third coordinate and a second conversion constant, which is different from the first conversion constant, for converting the second coordinate into the fourth coordinate.

When the joystick is tilted, it outputs a positional signal depending on the tilted position, and the tilted position based on the positional signal is converted into an image position on the displayed image using different conversion constants for one set of two-dimensional coordinates and the other set of two-dimensional coordinates. Therefore, the area on the displayed image in which the point can be designated is of an elongate rectangular shape (or an elliptical shape) rather than a square shape (or a circular shape.

The image displayed on the display screen may be an image of a video baseball game, and the designated point may represent a pitching position in which a pitcher is to pitch a baseball or a swinging position in which a batter is to swing a bat.

The designated point may represent selectively a pitching position in which a pitcher is to pitch a baseball and a swinging position in which a batter is to swing a bat, and the first and second two-dimensional coordinates may be converted respectively into the third and fourth two-dimensional coordinates with different sets of the first and second conversion constants respectively for the point representing the pitching position and the point representing the swinging position.

The point representing the pitching position may be designated in a first area and the point representing the swinging position may be designated in a second area, the second area being included in the first area and smaller than the first area.

With the swinging and pitching positions being thus designatable, the game player of the video baseball game can enjoy the video baseball game with substantially the same realistic feeling as when playing actual baseball matches.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
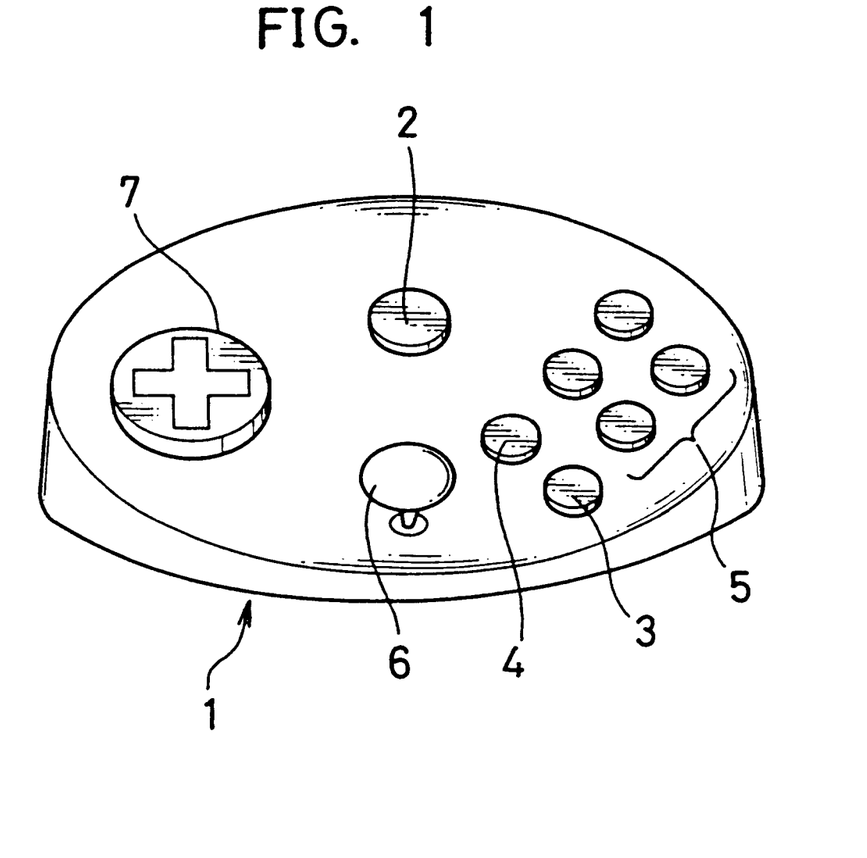
FIG. 1 is a perspective view of a manual controller of an apparatus for designating a point within a given area on a displayed image according to the present invention.

An apparatus for designating a point within a given area on a displayed image according to the present invention has a manual controller 1 shown in FIG. 1. The apparatus typically incorporated in a video game system for playing a video game which will be described as a video baseball game in the preferred embodiment of the present invention.

As shown in FIG. 1, the manual controller 1 has a start button 2 for starting a video game, a selector button 3 for selecting a pitching mode or a batting mode, a cancel button 4, a plurality of control switches 5 for controlling the motion of an image that will be displayed on a display screen, and an analog joystick 6 for designating a point in a given area on the displayed image.

The analog joystick 6 is used to designate a pitching position or a swinging position in a given area on a displayed image of the video baseball game. When the analog joystick 6 is operated by the game player of the video baseball game, it is tilted to a position in a desired direction in a two-dimensional plane, and outputs a positional signal depending on the tilted position thereof. The analog joystick 6 is also used to move the position of any of the fielders in the video baseball game.

The manual controller 1 also has a digital joystick 7 comprising a cross key. As with the analog joystick 6, the digital joystick 7 also serves to designate a pitching position or a swinging position in a given area on a displayed image of the video baseball game.

Figure 2:
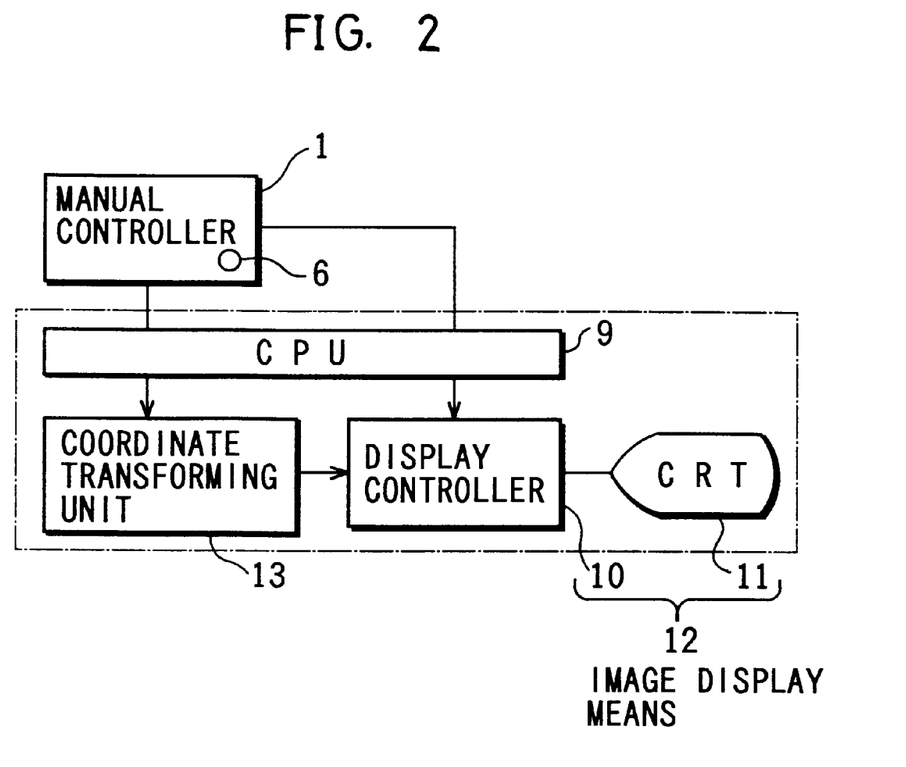
FIG. 2 is a block diagram of the apparatus.

As shown in FIG. 2, the apparatus according to the present invention has a central processing unit (CPU) 9 for carrying out the video baseball game according to a game program and control signals supplied from the manual controller 1. The apparatus also includes a display controller 10 and a cathode-ray tube (CRT) 11 as an image display unit, which jointly constitute an image display means 12 for displaying an image based on given image data. The display controller 10 controls the CRT 11 to display images of the video baseball game on the display screen of the CRT 11. When control signals are supplied from the control switches 5 of the manual controller 1 to the CPU 9, the CPU 9 supplies display control signals to the display controller 10 for moving the displayed image depending on the control signals according to the game program. The game program is stored in a recording medium such as an internal ROM or a removable ROM cartridge, for example, in the video game system, and can be read by the CPU 9. The CRT 11 may be replaced with another display unit such as a liquid crystal display panel, a plasma display panel, or the like.

The positional signal from the analog joystick 6 is supplied through the CPU 9 to a coordinate transforming unit 13, which converts a contact position expressed as x and y coordinates of the joystick 6 based on the positional signal into an image position expressed as X and Y coordinates with respect to a reference point on the displayed image.

Figure 3:
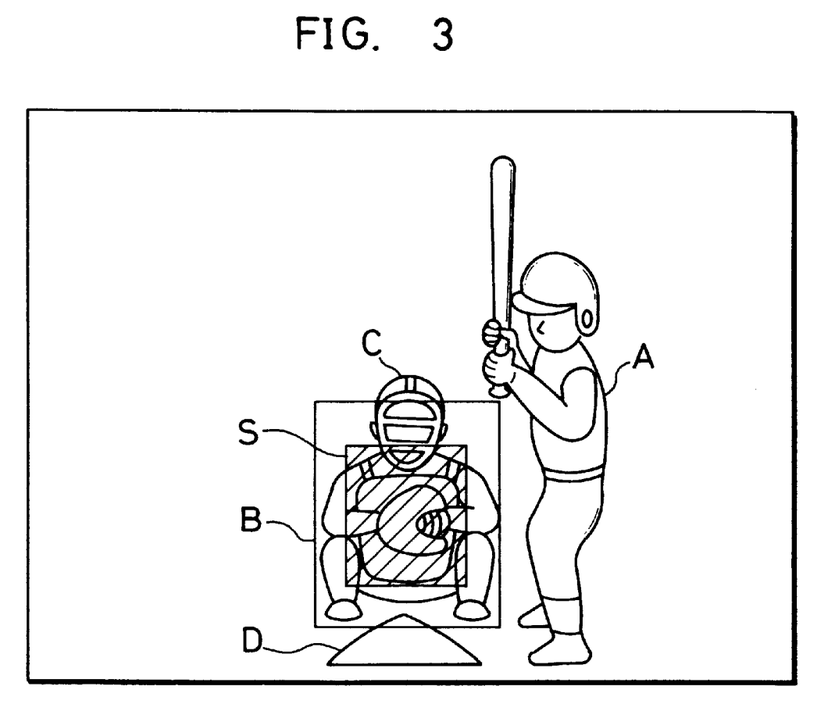
FIG. 3 is a view showing an image displayed on an image display unit when a video baseball game is being played on a video game system combined with the apparatus.

FIG. 3 shows an image displayed on the display screen of the CRT 11 by the display controller 10 under the control of the CPU 9 when the video baseball game is being played. The displayed image contains a batter A and a catcher C at a home plate D, the batter A and the catcher C waiting for a baseball to be thrown by a pitcher (not shown). As shown in FIG. 3, a strike zone S shown hatched which is positioned with respect to the batter A is usually vertically long rectangular shape on the displayed image. Since the pitcher may throw a baseball that is declared either a strike or a ball, a pitch zone B is of a vertically long rectangular shape greater than the strike zone S. The game player can designate a swinging position within the strike zone S, and can also designate a pitching position within the pitch zone B. However, if the batter A is to hit a ball, the game player can designate a swinging position within a zone greater than the strike zone S. Usually, the pitch zone B is greater-than such a zone greater than the strike zone S. Therefore, the game player can designate a pitching position within the pitch zone B but outside of such a zone greater than the strike zone S, in an attempt to give the batter A a deliberate walk. The game player can designate a pitching position in the pitching mode or a swinging position in the batting mode after having selected the pitching mode or the batting mode with the selector button 3. Alternatively, if the video baseball game is to proceed as a match between two baseball teams, then the baseball teams change their positions as batters and fielders each time three baseball players of the batting team are put out.

Figure 4:
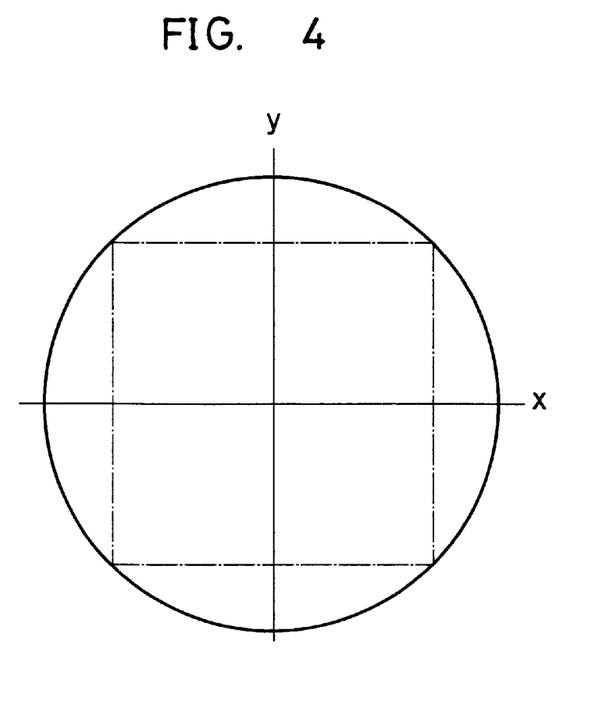
FIG. 4 is a diagram showing a square range of coordinates of the contact position of a joystick to be converted into a vertically long rectangular range of coordinates to be displayed on the image display unit.

When the game player tilts the analog joystick 6 in any direction within 360° in the two-dimensional plane, the contact position of the analog joystick 6 moves two-dimensionally in a circle having a given radius in an x-y coordinate system as shown in FIG. 4. Heretofore, coordinates in a square (shown by the dot-and-dash lines in FIG. 4) within the circle are converted into coordinates in a square in an X-Y coordinate system on the displayed image, and a conversion constant for converting x coordinates into X coordinates is the same as a conversion constant for converting y coordinates into Y coordinates. According to the present invention, however, the coordinate transforming unit 13 has different conversion constants for converting x, y coordinates into X, Y coordinates, respectively. Therefore, the square within the circle shown in FIG. 4 is converted into vertically long rectangular shapes such as the vertically long rectangular shapes S, B (see FIG. 3) in the X-Y coordinate system on the displayed image. The game player can now designate the pitching and the swinging positions within the vertically long rectangular shapes, using the analog joystick 6.

The coordinate transforming unit 13 converts the coordinates such that the square shown in FIG. 4 corresponds to the pitch zone B in the pitching mode, and corresponds to the strike zone S in the batting mode. Therefore, the conversion constants for converting x, y coordinates into X, Y coordinates, respectively, are changed between the pitching mode and the batting mode. However, as described above, conversion constants for converting x, y coordinates into X, Y coordinates, respectively, are different from each other in each of the pitching mode and the batting mode.

Figure 5:
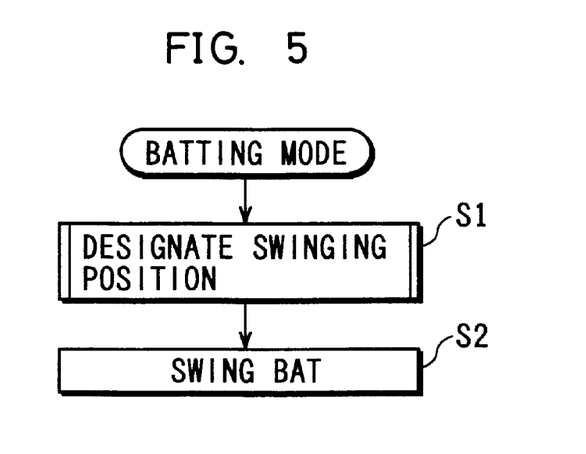
FIG. 5 is a flowchart of an operation sequence of the video baseball game in a batting mode.
Figure 6:
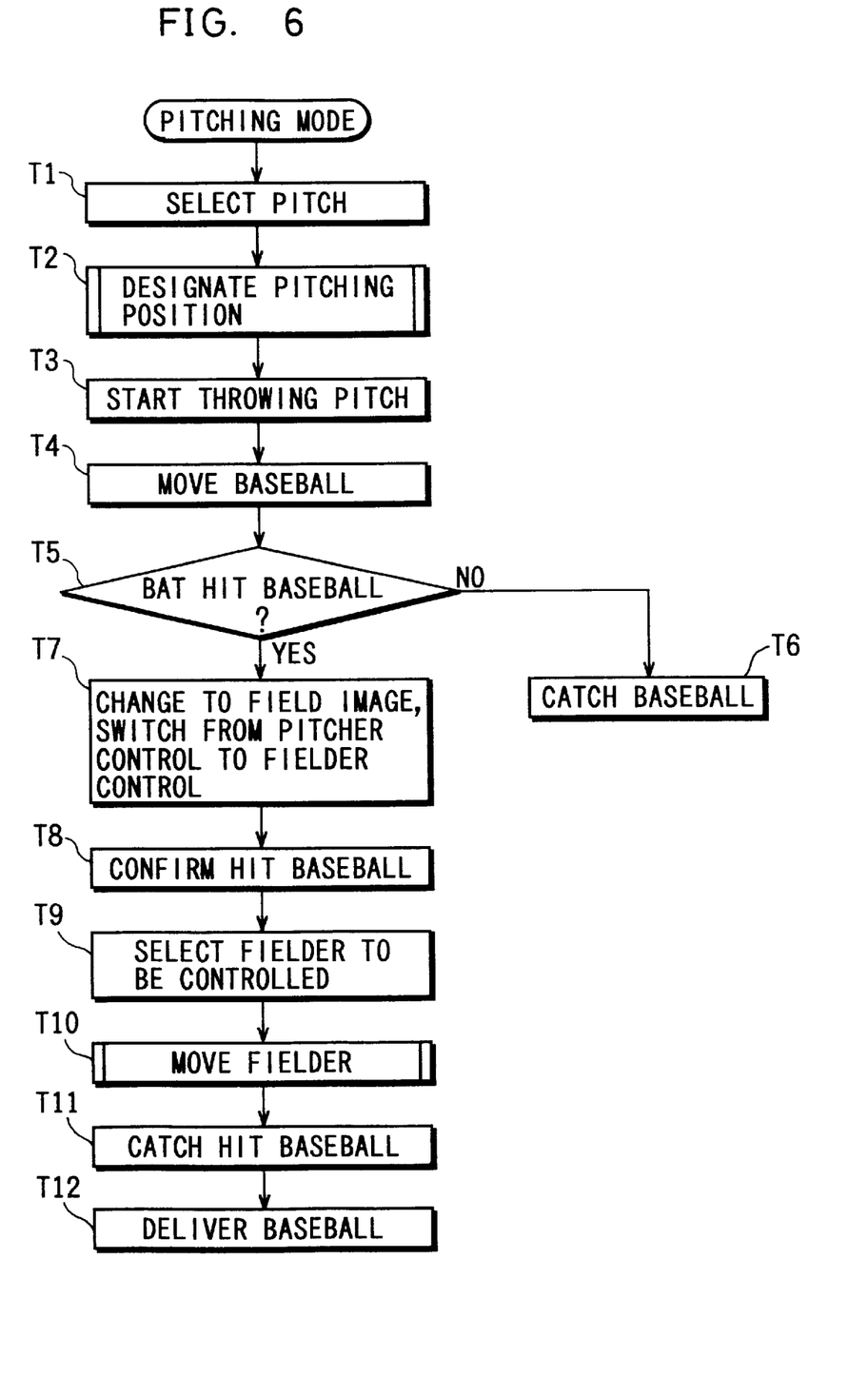
FIG. 6 is a flowchart of an operation sequence of the video baseball game in a pitching mode.

Operation sequences of the video baseball game in the batting mode and the pitching mode will be described below with reference to FIGS. 5 and 6.

The operation sequence of the video baseball game in the batting mode will first be described below with reference to FIG. 5. As shown in FIG. 5, when the game player operates the analog joystick 6 to designate a swinging position, the coordinate transforming unit 13 converts the coordinates of the contact position of the analog joystick 6 into the coordinates of a swing position, which is established in the strike zone S (see FIG. 3) on the display screen in a step S1. When the baseball thrown by the pitcher passes above the home plate D, the game player operates one of the control switches 5 to cause the batter A to swing the bat in a step S2. If the bat hits the baseball, then the CPU 6 controls the display controller 10 to change the displayed image to a field image. The game player then operates the manual controller 1 to control movement of the runner in the field image.

The operation sequence of the video baseball game in the pitching mode will be described below with reference to FIG. 6. As shown in FIG. 6, the game player operates one of the control switches 5 to select a pitch to be thrown by the pitcher A in a step T1. When the game player operates the analog joystick 6 to designate a pitching position, the coordinate transforming unit 13 converts the coordinates of the contact position of the analog joystick 6 into the coordinates of a pitching position, which is established in the pitch zone B (see FIG. 3) on the display screen in a step T2. The game player operates one of the control switches 5 to cause the pitcher to start throwing the pitch in a step T3. The CPU 9 controls the display controller 10 to move the image of the baseball displayed on the display screen in a step T4. The CPU 9 then determines whether the bat hits the baseball or not in a step T5. If the bat does not hit the baseball ("NO" in the step T5), then the CPU 9 controls the display controller 10 to display the catcher C as he catches the baseball in a step T6.

If the bat hits the baseball ("YES" in the step T5), then the CPU 6 controls the display controller 10 to change the displayed image to a field image, switching from pitcher control to fielder control in a step T7. Then, after having confirmed the hit baseball in a step T8, the CPU 6 basically selects a fielder closest to the hit baseball in a step T9. The game player operates the analog joystick 6 to move the selected fielder in a step T10. In the step T10, the direction in and the speed at which the fielder moves are determined by the direction in and the depth to which the analog joystick 6 is tiled. If the moved fielder touches the baseball, the fielder is interpreted as catching the baseball in a step T11. Then, the baseball is delivered from the fielder to a fielder on a base or a fielder in between in a step T12.

The game player can designate a swinging position in the vertically long rectangular strike zone S and also a pitching position in the vertically long rectangular pitch zone B that is wider than the strike zone S. Therefore, the game player can enjoy the video baseball game with substantially the same realistic feeling as when playing actual baseball matches.

Figure 7:
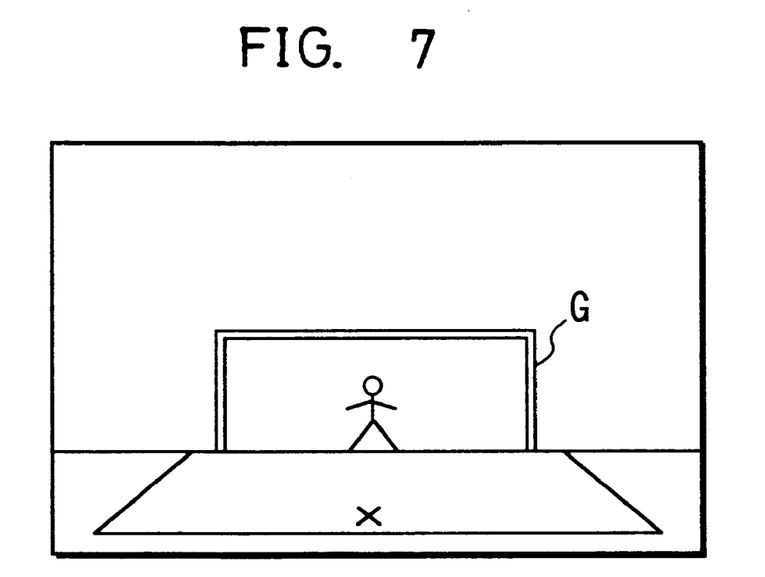
FIG. 7 is a diagram showing an image displayed on the image display unit when a video soccer game is being played on a video game system combined with the apparatus.

The apparatus according to the present invention may be combined with a video game system for playing a video soccer game. In the video soccer game, the game player uses the analog joystick 6 to designate a shooting position for a penalty-kick in the video soccer game. Specifically, as shown in FIG. 7, the square shown in FIG. 4 is converted into a horizontally long rectangular shape substantially equal to a shoot zone surrounded by a goal post G on the displayed image in the video soccer game, and the game player designates a shooting position for a penalty-kick in the shoot zone.

According to the present invention, one or both of the conversion constants for converting x, y coordinates into X, Y coordinates, respectively, may be modified depending on the displayed image for conversion of the coordinates of the contact position of the analog joystick 6 into the coordinates of an image position on the displayed image. The game player is thus allowed to designate a desired point in an area depending on the displayed image.

The principles of the present invention are applicable to various video game systems for playing various games, other than the video baseball game and the video soccer game, insofar as they use an analog joystick for designating a desired point in a given area on the displayed image.

Although a certain preferred embodiment of the present invention has been shown and described in detail, it should be understood that various changes and modifications may be made therein without departing from the scope of the appended claims.

What is claimed is:

1. An apparatus for designating a position in an area on a displayed image, comprising:

image display means for displaying an image on a display screen;

designating means for designating a point in a predetermined area having different vertical and horizontal dimensions on the image displayed on the display screen;

said designating means including a joystick tiltable in a two-dimensional direction for generating a positional signal corresponding to a tilted position thereof; and a coordinate transforming unit for converting first and second two-dimensional coordinates of said tilted position based on said positional signal respectively into third and fourth two-dimensional coordinates of an image position with respect to a predetermined reference position on said displayed image, with a first conversion constant for converting the first coordinate into the third coordinate and a second conversion constant, which is different from said first conversion constant, for converting the second coordinate into the fourth coordinate.

2. an apparatus according to claim 1, wherein said image display means comprises means for displaying an image of a video baseball game, and said point designated by said designating means represents a pitching position in which a pitcher is to pitch a baseball.

3. An apparatus according to claim 1, wherein said image display means comprises means for displaying an image of a video baseball game, and said point designated by said designating means represents a swinging position in which a batter is to swing a bat.

4. An apparatus according to claim 1, wherein said image display means comprises means for displaying an image of a video baseball game, and said point designated by said designating means represents selectively a pitching position in which a pitcher is to pitch a baseball and a swinging position in which a batter is to swing a bat, and wherein said coordinate transforming unit comprises means for converting said first and second two-dimensional coordinates respectively into said third and fourth two-dimensional coordinates with different sets of said first and second conversion constants respectively for the point representing said pitching position and the point representing said swinging position.

5. An apparatus according to claim 4, wherein said designating means comprises means for designating the point representing said pitching position in a first area and designating the point representing said swinging position in a second area, said second area being included in said first area and smaller than said first area.

6. A method of designating a position in an area on a displayed image, comprising the steps of:

displaying an image on a display screen;

designating a point in a predetermined area having different vertical and horizontal dimensions on the image displayed on the display screen, with a joystick tiltable in a two-dimensional direction for generating a positional signal corresponding to a tilted position thereof; and converting first and second two-dimensional coordinates of said tilted position based on said positional signal respectively into third and fourth two-dimensional coordinates of an image position with respect to a predetermined reference position on said displayed image, with a first conversion constant for converting the first coordinate into the third coordinate and a second conversion constant, which is different from said first conversion constant, for converting the second coordinate into the fourth coordinate.

7. A method according to claim 6, wherein said step of displaying comprises the step of displaying an image of a video baseball game, and the designated point represents a pitching position in which a pitcher is to pitch a baseball.

8. A method according to claim 6, wherein said step of displaying comprises the step of displaying an image of a video baseball game, and the designated point represents a swinging position in which a batter is to swing a bat.

9. A method according to claim 6, wherein said step of displaying comprises the step of displaying an image of a video baseball game, and the designated point represents selectively a pitching position in which a pitcher is to pitch a baseball and a swinging position in which a batter is to swing a bat, and wherein said step of converting comprises the step of converting said first and second two-dimensional coordinates respectively into said third and fourth two-dimensional coordinates with different sets of said first and second conversion constants respectively for the point representing said pitching position and the point representing said swinging position.

10. A method according to claim 9, wherein said step of designating comprises steps of designating the point representing said pitching position in a first area and designating the point representing said swinging position in a second area, said second area being included in said first area and smaller than said first area.

11. A computer-readable medium having stored thereon program data comprising executable code for execution by a computer processor causing said computer processor to perform the steps of:

designating a position in an area on a displayed image by displaying an image on a display screen;

designating a point in a predetermined area having different vertical and horizontal dimensions on the image displayed on the display screen, with a joystick tiltable in a two-dimensional direction for generating a positional signal corresponding to a tilted position thereof; and converting first and second two-dimensional coordinates of said tilted position based on said positional signal respectively into third and fourth two-dimensional coordinates of an image position with respect to a predetermined reference position on said displayed image, with a first conversion constant for converting the first coordinate into the third coordinate and a second conversion constant, which is different from said first conversion constant, for converting the second coordinate into the fourth coordinate.

12. A computer-readable medium according to claim 11, wherein said image displayed on the display screen comprises an image of a video baseball game, and the designated point represents a pitching position in which a pitcher is to pitch a baseball.

13. A computer-readable medium according to claim 11, wherein said image displayed on the display screen comprises an image of a video baseball game, and the designated point represents a swinging position in which a batter is to swing a bat.

14. A computer-readable medium according to claim 11, wherein said image displayed on the display screen comprises an image of a video baseball game, and the designated point represents selectively a pitching position in which a pitcher is to pitch a baseball and a swinging position in which a batter is to swing a bat, and wherein said first and second two-dimensional coordinates are converted respectively into said third and fourth two-dimensional coordinates with different sets of said first and second conversion constants respectively for the point representing said pitching position and the point representing said swinging position.

15. A computer-readable medium according to claim 14, wherein the point representing said pitching position is designated in a first area and the point representing said swinging position is designated in a second area, said second area being included in said first area and smaller than said first area.

16. An apparatus for designating a position in an area on a displayed image, comprising:

an image display unit for displaying an image;

a joystick, tiltable to a tilted position in a two-dimensional direction, for designating a point corresponding to said tilted position in a predetermined area having different vertical and horizontal dimensions on the displayed image; and a coordinate transforming unit for converting first and second two-dimensional coordinates of said tilted position respectively into third and fourth two-dimensional coordinates of an image position with respect to a predetermined reference position on said displayed image, with a first conversion constant for converting the first coordinate into the third coordinate and a second conversion constant, which is different from said first conversion constant, for converting the second coordinate into the fourth coordinate.

17. An apparatus according to claim 16, wherein said displayed image comprises an image of a video baseball game, and said designated point represents a pitching position in which a pitcher is to pitch a baseball.

18. An apparatus according to claim 16, wherein said displayed image comprises an image of a video baseball game, and said designated point represents a swinging position in which a battery is to swing a bat.

19. An apparatus according to claim 16, wherein said displayed image comprises an image of a video baseball game, and said designated point represents selectively a pitching position in which a pitcher is to pitch a baseball and a swinging position in which a battery is to swing a bat.

20. An apparatus according to claim 16, wherein said displayed image comprises an image of a video soccer game, and said designated point represents selectively a shooting position for a penalty-kick in the video soccer game.

21. An apparatus for designating a position in an area on a displayed image, comprising:

image display means for displaying an image on a display screen;

designating means for designating a point in a predetermined area having different vertical and horizontal dimensions on the image displayed on the display screen;

said designating means including a joystick tiltable in a two-dimensional direction for generating a positional signal corresponding to a tilted position thereof, a maximum tilted position of the joystick in the two-dimensional direction corresponding to an extreme position of the predetermined area, and a non-tilted position of the joystick corresponding to a central position of the predetermined area; and a coordinate transforming unit for converting first and second two-dimensional coordinates of said tilted position based on said positional signal respectively into third and fourth two-dimensional coordinates of an image position with respect to a predetermined reference position on said displayed image, with a first conversion constant for converting the first coordinate into the third coordinate and a second conversion constant, which is different from said first conversion constant, for converting the second coordinate into the fourth coordinate.

22. An apparatus for designating a position in an area on a displayed image, comprising:

a display unit for displaying an image;

a joystick, movable in a two-dimensional direction from a non-tilted position to a tilted position in which it is deflected at a deflection angle relative said non-tilted position, the joystick generating a positional signal representative of the deflection angle and the two-dimensional direction in which is deflected; and a coordinate transforming unit for converting first and second two-dimensional coordinates based upon the positional signal of said tilted position respectively into third and fourth two-dimensional coordinates of an image position with respect to a predetermined reference position on said displayed image, the coordinate transforming unit utilizing a first conversion constant for converting the first coordinate into the third coordinate and a second conversion constant, which is different from said first conversion constant, for converting the second coordinate into the fourth coordinate.

23. A method of designating a point location on a displayed image which incudes a predetermined area having different vertical and horizontal dimensions, comprising the steps of:

moving a joystick, in a two-dimensional direction at a particular angle of defection relative a non-tilted position thereof, to a tilted position;

generating a positional signal corresponding to the tilted position; and converting first and second two-dimensional coordinates of said tilted position based on said positional signal respectively into third and fourth two-dimensional coordinates of an image position with respect to a predetermined reference position on said displayed image using a first conversion constant for converting the first coordinate into the third coordinate and a second conversion constant, which is different from said first conversion constant, for converting the second coordinate into the fourth coordinate.

24. A method according to claim 23, further comprising:

selectively dimensioning the predetermined area as a first area and a second area; and using different sets of said first and second conversion constants respectively for conversions of said first and second coordinates relating to each of said first and second areas.

25. A method according to claim 24, wherein said second area is smaller than said first area, said second area being included within said first area.

26. A method according to claim 23, wherein:

said image is representative of a video baseball game; and the designated point represents a pitching position in which a pitcher is to pitch a baseball.

27. A method according to claim 23, wherein:

said image is representative of a video baseball game; and the designated point represents a swinging position in which a pitcher is to pitch a baseball.

28. A method according to claim 25, wherein:

said image is representative of a video baseball game; and
said first area corresponds to a pitch zone and said second area corresponds to a strike zone.

* * * * *